United States Patent [19]
Hauck et al.

[11] Patent Number: 5,719,609
[45] Date of Patent: Feb. 17, 1998

[54] METHOD AND APPARATUS FOR REDUNDANT SEALING OF A PRINTHEAD PRESSURE REGULATOR

[75] Inventors: Mark Hauck; Ronald W. Hall, both of Corvallis, Oreg.

[73] Assignee: Hewlett-Packard Company, Palo Alto, Calif.

[21] Appl. No.: 701,367

[22] Filed: Aug. 22, 1996

[51] Int. Cl.⁶ .......................... B41J 2/175; E03B 11/06
[52] U.S. Cl. .................................. 347/85; 137/907
[58] Field of Search ........................ 347/85–87, 7, 347/89; 137/565, 907; 222/95, 103

[56] References Cited

U.S. PATENT DOCUMENTS

| 4,339,761 | 7/1982 | Matsumoto et al. | 347/85 |
| 5,367,328 | 11/1994 | Erickson | 347/85 |

FOREIGN PATENT DOCUMENTS

| 62-225352 | 10/1987 | Japan | 347/86 |

Primary Examiner—Benjamin R. Fuller
Assistant Examiner—Judy Nguyen

[57] ABSTRACT

A fail-safe, stop valve for an ink-jet print head in a pressurized ink delivery system. The stop valve is actuated by a back pressure regulator if the operating pressure of the print head approaches atmospheric pressure during operation.

9 Claims, 4 Drawing Sheets

METHOD AND APPARATUS FOR REDUNDANT SEALING OF A PRINTHEAD PRESSURE REGULATOR

FIELD OF INVENTION

The present invention generally relates to ink-jet printing and, more particularly, to apparatus and methods for delivering ink to print heads.

BACKGROUND OF THE INVENTION

The art of ink-jet technology is relatively well developed. Commercial products such as computer printers, graphics plotters, and facsimile machines employ ink-jet technology for producing printed media. Hewlett-Packard's contributions to this technology are described, for example, in various articles in the *Hewlett-Packard Journal*, Vol. 36, No. 5 (May 1985), Vol. 39, No. 4 (August 1988), Vol. 39, No. 5 (October 1988), Vol. 43, No. 4 (August 1992), Vol. 43, No. 6 (December 1992), and Vol. 45, No. 1 (February 1944).

Generally, an ink-jet image is formed when a precise pattern of dots is ejected from a drop generating device known as a "print head" onto a printing medium. The typical ink-jet print head has an array of precisely formed nozzles attached to a thermal ink-jet print head substrate. The substrate incorporates an array of firing chambers that receive liquid ink (colorant dissolved or dispersed in a solvent) from an ink reservoir. Each chamber has a thin-film resistor, known as a "firing resistor", located opposite each nozzle so ink can collect between the firing resistor and the nozzle. When electric printing pulses heat the thermal ink-jet firing resistor, a small volume of ink adjacent the firing resistor is heated, vaporizing a bubble of ink, and thereby ejecting a drop of ink from the print head. The droplets strike the printing medium and then dry to form "dots" that, when viewed together, form the printed image.

In general, the ink within a print head has an operating pressure chosen between two limiting conditions. The operating pressure must be sufficiently low so that during operation the ink remains within the print head and does not run freely out of the firing chambers and the nozzles. This phenomenon of free running ink is called drooling. On the other hand, the operating pressure of the print head must be sufficiently high so that the when the firing resistor is heated, the vaporized bubble of ink can over come the pressure and eject a droplet of ink from the firing chamber. Most print heads today operate at a slight vacuum, typically in a pressure range of between about −2" (minus two inches) of water to about −10" (minus ten inches) of water.

In the future ink-jet print heads may be located in printers having pressurized ink supplies. A pressurized ink supply enables ink to be supplied to the print head at higher flow rates than non-pressurized systems. The ink in such a system is pressurized in a reservoir to a supply pressure of between about +30" (plus thirty inches) of water to about 3 psi (three pounds per square inch) and is delivered to the print head using either a tube or a conduit. A back pressure regulator is normally located near the print head to reduce the supply pressure of the ink down to the operating pressure of the print head.

Needless to say, such pressurized ink supply systems that operate above atmospheric pressure have the potential for developing leaks that may result in ink running out of the print head or its housing. Thus, there is a need for a fail/safe valve to prevent such incidents.

It should be appreciated that there was no need to solve this problem in previous ink delivery systems because such systems operated on capillary pressure and at a slight vacuum. Further, these unpressurized systems did not incorporate a back pressure regulator that could fail to shut during operation and that could over pressurize the print head to the point of running as a result.

SUMMARY OF THE INVENTION

Briefly and in general terms, an apparatus according to the present invention includes a print head having an operating pressure of less than atmospheric pressure, a source of ink having a supply pressure of greater than the print head operating pressure, and a back pressure regulator for reducing the supply pressure of the ink down to the print head operating pressure. The invention further includes a conduit for the ink connecting the ink source, the back pressure regulator, and the print head; and a stop valve connected to the conduit. The stop valve has an open position and a shut position with respect to the conduit. If the operating pressure of the print head approaches atmospheric pressure, the stop valve is actuated to the conduit shut position.

The invention also includes a method for preventing ink from running from a print head by blocking the flow of ink to the print head if the operating pressure approaches atmospheric pressure during operation.

One advantage of the present invention is redundant sealing of the pressurized ink in the ink delivery conduit. This is also called "two-valve" protection. A conventional back pressure regulator incorporates a throttling valve which can block ink flow. In addition, here there is also a stop valve that will block the flow of pressurized ink if the throttling valve fails to shut.

Other aspects and advantages of the invention will become apparent from the following detailed description, taken in conjunction with the accompanying drawings, illustrating by way of example the principles of the invention.

BRIEF DESCRIPTION OF THE DRAWINGS

FIG. 1 illustrates normal operation.

FIG. 2 illustrates the failed condition.

FIG. 3 illustrates the start up or non-operating condition.

DESCRIPTION OF THE PREFERRED EMBODIMENTS

Figure 1:
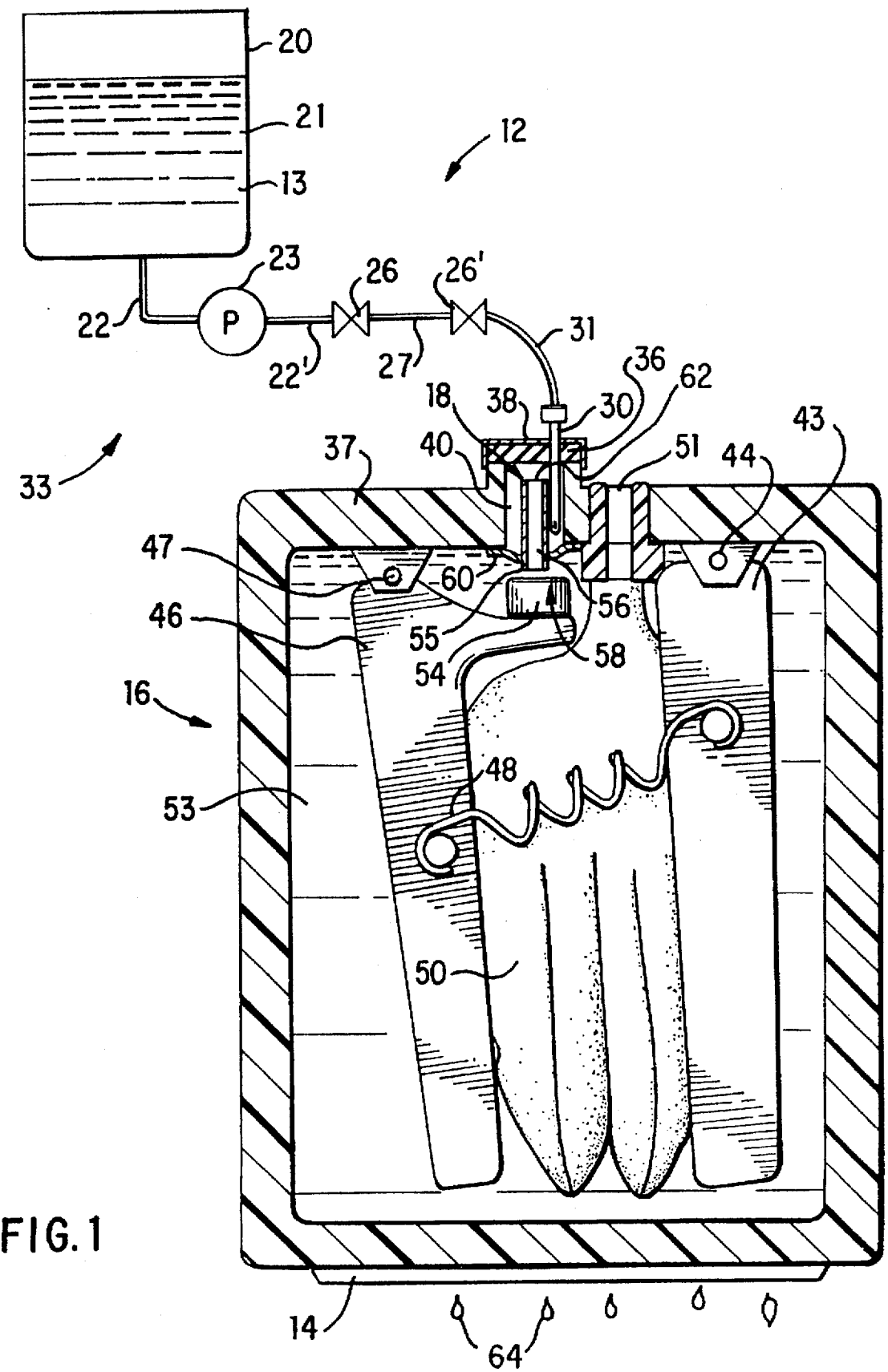
FIG. 1 is a diagrammic, side elevational view, partially in section, of an apparatus for preventing running from a print head embodying the principles of the invention.

As shown in the drawings for the purposes of illustration, the invention is embodied in an ink supply apparatus 12, FIG. 1 that delivers ink under pressure from an ink source 13 to a print head 14. A back pressure regulator 16 (sometimes referred to as a "print cartridge") located near the print head 14 actuates a stop valve 18 to prevent ink from running from the print head 14.

Referring to FIG. 1, reference numeral 13 indicates a source of ink. The source of ink in this embodiment is an ink reservoir 20 containing a metalized film bag, not shown, containing liquid ink 21. The ink reservoir 20 is connected to a pump 23 by tubing 22. The pump is of conventional construction and pressurizes the ink to a supply pressure of between about +30" (plus thirty inches) of water and about +90" (plus ninety inches) of water. The pump 23 is connected by tubing 22' to two fluid interconnects 26, 26' and connecting tubing 27 of conventional construction. The fluid interconnect allows the engagement and disengagement of the ink reservoir 20 and the pump 23 from the back pressure regulator 16 without allowing either ink to flow out of the system or air to enter the tubing. The fluid interconnect is further connected to a hollow needle 30 by tubing 31. The hollow needle is likewise of conventional construction. The tubing 22, the fluid interconnect, the tubing 31 and the hollow needle 30 together form a portion of the ink delivery conduit 33. This portion provides a conduit for ink to flow under supply pressure from the ink reservoir 20 to the back pressure regulator 16.

It should be appreciated that the pressurized ink supply 12 can take many forms including a spring actuated diaphragm, an air pressurized reservoir, and a gravity driven supply. The only limitation on the pressurized ink supply is that it must have a supply pressure that is greater than the operating pressure of the print head 14.

Referring to FIG. 1, ink is delivered to the back pressure regulator 16 from the pressurized ink supply 12 through the hollow needle 30. The hollow needle penetrates through a rubber septum 36 located on the top portion of the housing 37 of the regulator 16. The regulator housing is fabricated from a liquid crystal polymer or other suitable material. The rubber septum is held in place on the housing by a metal crimp cap 38. The bottom wall of the septum 36 and the side walls of the top portion of the regulator housing form an intermediate ink chamber 40. Ink is introduced into the intermediate ink chamber at supply pressure from the ink reservoir 20 by the hollow needle 30 of the ink delivery conduit 33.

Located within the intermediate ink chamber 40, FIG. 1, is a stop valve 18. The stop valve includes a flexible, coned disk 60 with a circular periphery rigidly mounted and sealed to the regulator housing 37. The disk 60 is an over-center spring and is hi-stable (two stable states) in either the convex or the concave position. The convex position of the disk 60 is illustrated in FIG. 1 and the concave, in FIG. 2. The disk in the preferred embodiment is a conventional Belleville spring. The stop valve also includes an inlet tube 56 that passes through the disk 60 and has a longitudinal axis normal to the plane of the disk. The inlet tube 56 is attached and sealed to the disk 60. The coned disk 60 and the inlet tube 56 form the bottom wall of the intermediate ink chamber 40. The inlet tube has an upper orifice 62 that is blocked by the bottom wall of the septum 36 when the coned spring disk 60 is in the concave position, FIG. 2. In such manner the septum's bottom wall serves as a valve seat for the stop valve 18. It should be appreciated that the stop valve 18 has two operating positions: open and shut. The stop valve does not throttle the flow of ink into the accumulator chamber 53 or throttle the operating pressure as does the pressuring regulating valve 58 as described below.

The back pressure regulator 16, FIG. 1, includes an accumulator lever 43 located within the housing 37. The accumulator lever rotates around a pivot 44 attached to the housing. The regulator also includes a pressure regulating lever 46 and its associated pivot 47. The two levers are urged together by a spring 48. Further, the two levers are urged apart by a bag 50. The bag is light weight, flexible, deformable, and non-elastic. The bag 50 is fabricated from a thin, high barrier plastic based film into four adjacent pockets to increase the bag's contact with the arms of the levers 43, 46. The inside of the bag is vented to the atmosphere through a vent port 51 and is at atmospheric pressure at all times. The outside of the bag is subjected to the operating pressure of the print head 14 which is also the pressure within the accumulator chamber 53. The operating pressure varies as described below.

The pressure regulating lever 46, FIG. 1, has a valve seat 54 that engages a lower orifice 55 on an inlet tube 56. The valve seat is fabricated from a silicone elastomer. The valve seat 54 and the orifice 55 form the pressure regulating, throttling valve 58 in the regulator. The pressure regulating valve 58 drops the pressure of the ink from the supply pressure in the intermediate chamber 40 down to the print head operating pressure in the accumulator chamber 53 and maintains the operating pressure therein during operation of the print head 14.

Figure 3:
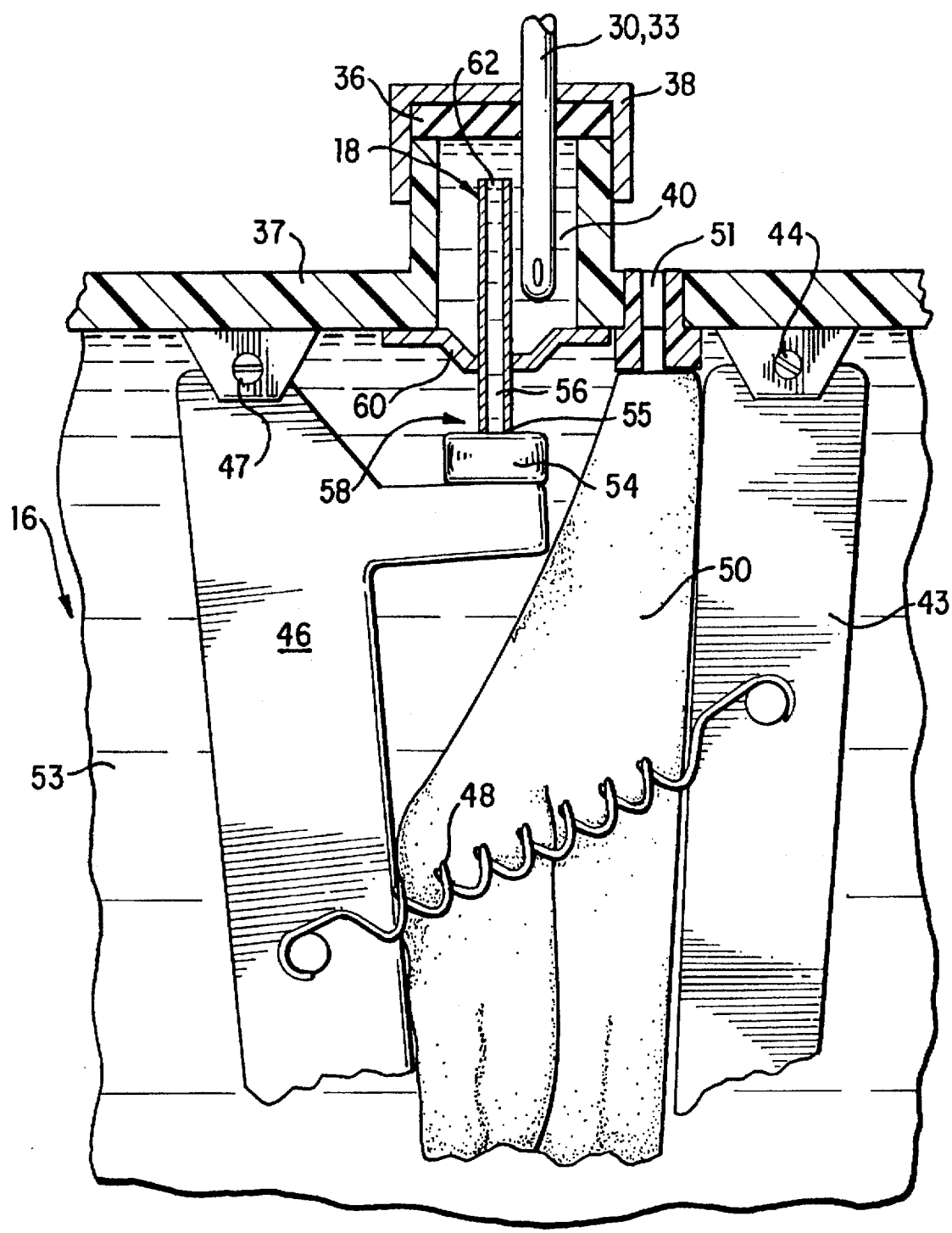
FIG. 3 is a side elevational view, partially in section and partially cut away, of the apparatus of FIG. 1.

FIGS. 1 and 3 illustrate the normal operational positions of the pressure regulator 16. In particular FIG. 3 depicts the normal print mode operating position of the regulator. The print head 14 is ready to eject ink and the regulator 16 is in a condition of static equilibrium. The stop valve 18 is normally open and the pressure regulating valve 58 is normally shut. Ink at the supply pressure fills the intermediate ink chamber 40, and the coned spring disk 60 is in the convex position. The accumulator chamber 53 is also filled with ink at the print head operating pressure. The inside of the bag 50 is at atmospheric pressure because of the vent 51, and the outside of the bag is subjected to the print head operating pressure by the ink in the accumulator chamber 53.

When the print head 14, FIG. 1, begins to eject droplets 64 of ink, the ink in the accumulator chamber 53 flows into the print head through a plurality of channels, not shown. In effect, the print cartridge pumps ink out of the accumulator chamber 53 when printing. The ink flowing out of the accumulator chamber 53 causes the operating pressure in the accumulator chamber to decrease. The decreasing operating pressure in the accumulator chamber 53 causes the bag 50 to expand because the inside of the bag is referenced to atmospheric pressure. When the bag 50 expands, the bag rotates the pressure regulating lever 46 about the pivot 47 and the valve seat 54 moves away from the lower orifice 55 of the inlet tube 56. As illustrated in FIG. 1, the pressure regulating valve 58 thus opens, and ink at the supply pressure in the intermediate chamber 40 flows into the accumulator chamber 53. This flow continues until the normal operating pressure is restored in the accumulator chamber 53 and the bag 50 sufficiently deflates to shut the pressure regulating valve 58. As described above, the action of the pressure regulating valve 58 is flow and pressure throttling. The spring 48 urges the regulating valve 58 to the valve shut position. The stop valve 18 remains open during the above described cycle, and ink is supplied through the hollow needle 30 to the intermediate chamber 40 continually at the supply pressure.

By design, the accumulator lever 43, FIG. 1, does not primarily react to pressure changes in the accumulator chamber 53 due to ink being ejected by the print head 14. The accumulator lever 43 moves to compensate for changes in the volume of any undissolved gases in the accumulator chamber 53 due to the temperature changes of the ink and changes in atmospheric pressure due to changes in elevation and weather.

Figure 2:
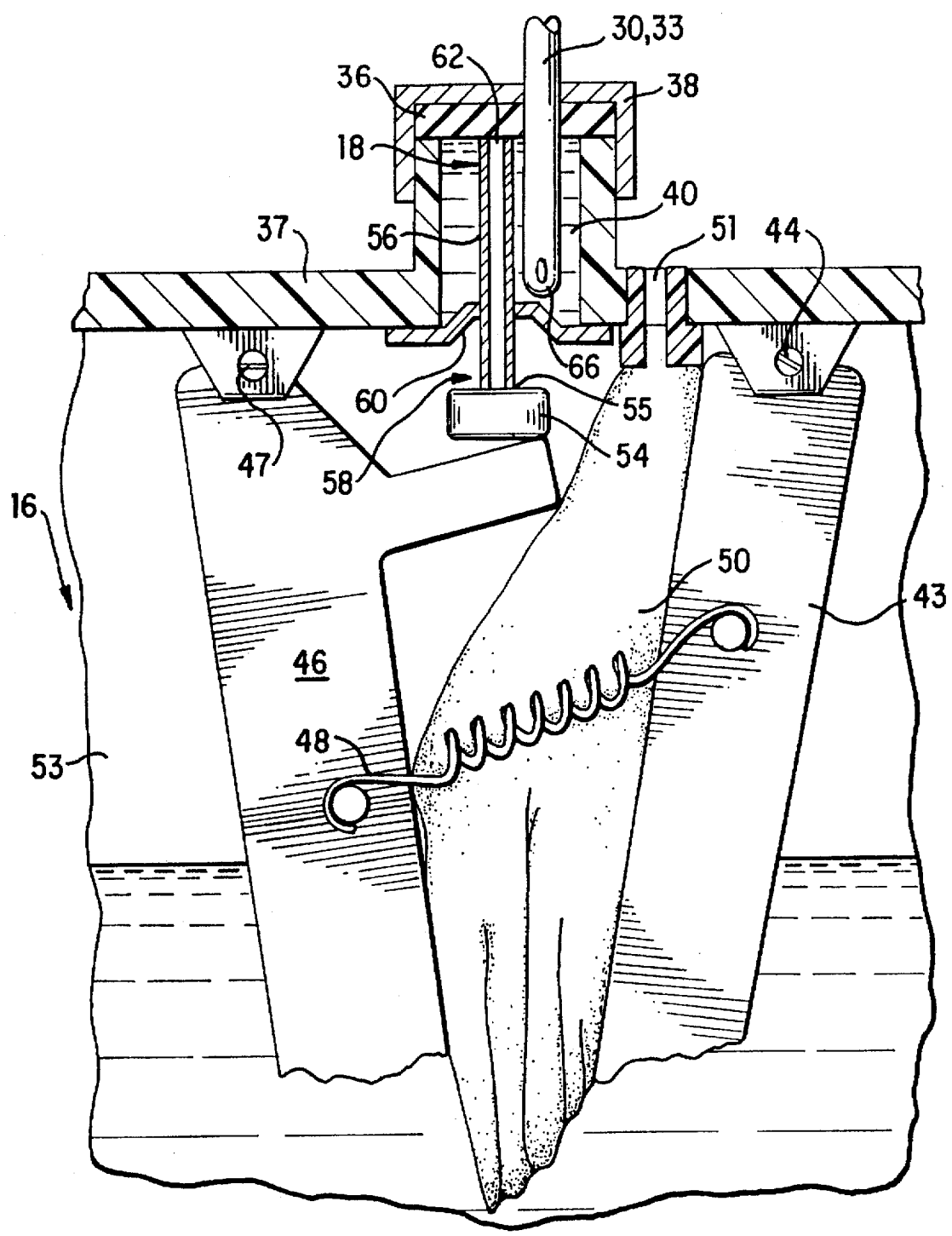
FIG. 2 is a side elevational view, partially in section and partially cut away, of the apparatus of FIG. 1.

FIG. 2 illustrates the failed condition when the operating pressure in the accumulator chamber 53 has risen from a slight vacuum to atmospheric pressure or higher and the differential pressure across the bag has gone to zero (0) or negative. The spring 48 urges the two levers 43, 46 together until their tips touch, not shown in FIG. 2. In this condition the capillary pressure of the ink in the print head is overcome, and ink could begin to run out of the print head 14 nozzles (not shown) since there no longer is any pressure to hold the ink back.

There are several situations when the pressure in the accumulator chamber 53 can go to atmospheric pressure or higher. First, the pressure regulating valve 58 could fail to shut. Debris could block the orifice 55 from engaging the valve seat 54. Also, the lever 46 could seize about the pivot 47. The accumulator chamber 53 would then become over pressurized by the ink at supply pressure in the intermediate ink chamber 40. Secondly, a crack or hole in the regulator housing 37 could release the vacuum in the accumulator chamber 53. Thirdly, the bag 50 could develop a hole and the differential pressure across it could go to zero.

To reach the failed condition illustrated in FIG. 2, the bag 50 first began to collapse. The pressure in the accumulator chamber 53 went from a slight vacuum up toward atmospheric pressure. The pressure regulating valve 58 either shut or was urged shut by the spring 48 as illustrated in FIG. 3. Simultaneously, the force on the pressure regulating lever 46 due to this change in pressure was sufficient to flex the coned spring disk 60 from the convex position illustrated in FIG. 3 to the concave position illustrated in FIG. 2. The regulating lever 46 applied so much force on the inlet tube 56 that the coned spring disk 60 went from one bi-stable position to the other. When the spring disk 60 went to the concave position, FIG. 2, the stop valve 18 shut. In other words, the inlet tube 56 moved upward and the upper orifice 62 became blocked by the bottom wall of the septum 36 acting as a valve seat.

As illustrated in FIG. 2 the ink delivery conduit 33 is blocked by the stop valve 18 as well as the pressure regulating valve 58. Such redundant sealing is important if the pressure regulating valve 58 does not shut completely.

The convex position of the spring disk as illustrated in FIGS. 1 and 3 can be restored from the concave position in FIG. 2 because the spring disk acts as an over-center spring with two stable positions. The hollow needle 30 can be manually moved downward along its longitudinal axis. The needle has a blunt end 66 that can engage the upper surface of the spring disk and force the disk back to the bi-stable, convex position. Thus, if desired, the needle 30 can reopen the stop valve 18 once it is shut.

Figure 4:
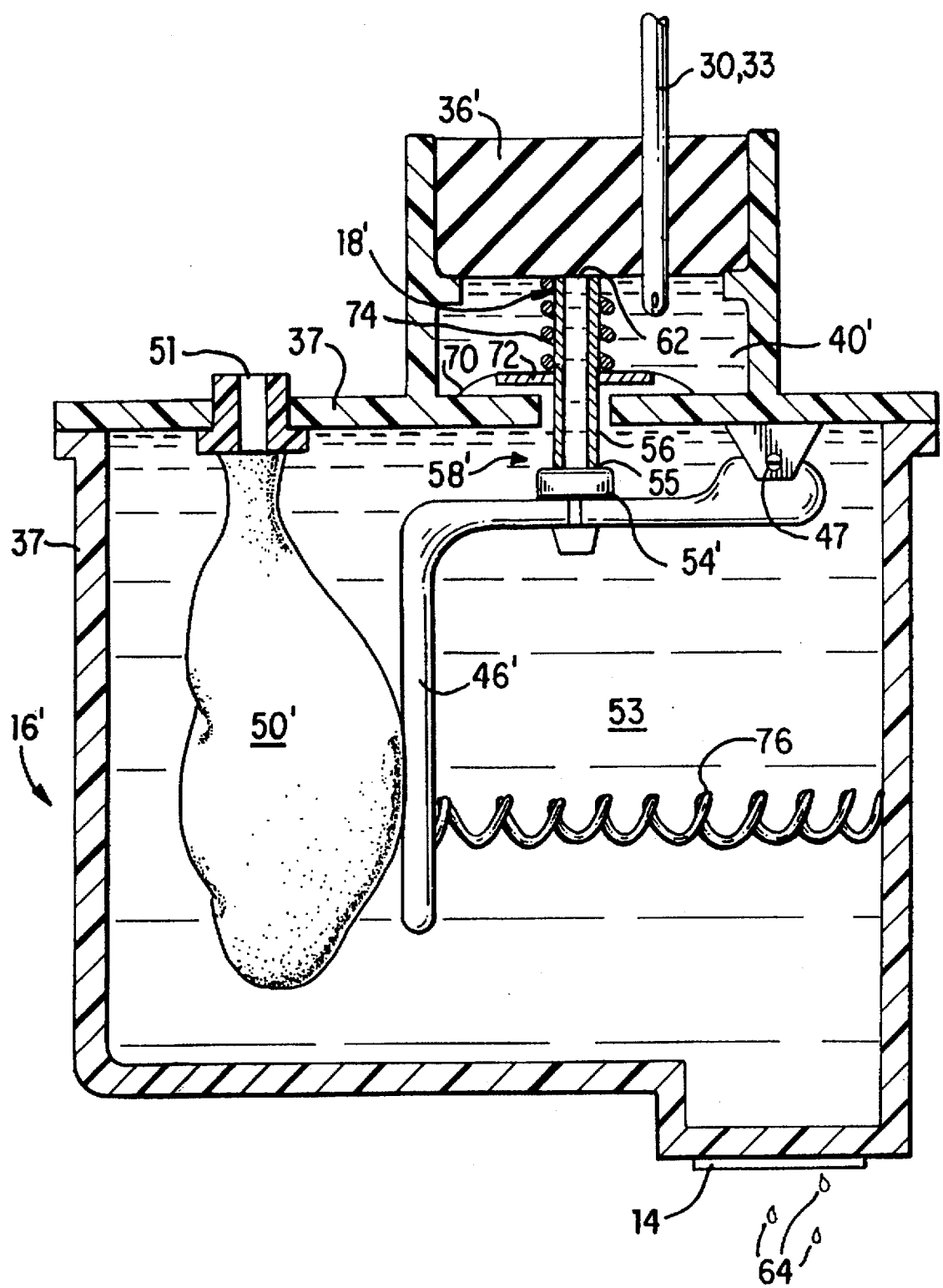
FIG. 4 is a side elevational view, partially in section, of an alternative embodiment of the present invention.

In the alternative embodiment illustrated in FIG. 4, the inlet tube 56 moves continuously or floats between two distal, vertical positions and is not bi-stable. In FIG. 4 like-numbered, primed parts have essentially the same construction and function as those unprimed parts described above. Instead of the coned, spring disk 60, FIG. 1, a flexible, non-elastic, domed skirt 70 is attached to the top wall of the regulator housing 37 and is bonded to the inlet tube 56. The skirt forms a fluid tight seal in the bottom of the intermediate ink chamber 40'. The inlet tube 56 further includes a stop 72 that halts the downward motion of the inlet tube and allows the pressure regulating valve 58' to open when the bag 50' expands. The inlet tube also is urged downward with respect to the septum 36' by a helical coiled spring 74. In addition, a coiled spring 76 urges the regulating lever 46' about the pivot 47 shutting the pressure regulating valve 58' and urging the inlet tube 56 upward.

During normal operation the stop valve 18', FIG. 4 is normally open and the pressure regulating valve 58' is normally shut. During printing the pressure in the accumulator chamber 53 is throttled and maintained by the pressure regulating valve 58'. The operation of valve 58' is the same that described above in connection with FIGS. 1 and 3.

If the pressure in the accumulator chamber 53 approaches atmospheric pressure as described above in connection with FIG. 2, the bag 50' deflates. The upper orifice 62 of the inlet tube 56 engages the bottom wall of the spectum 36', and the stop valve 18' shuts to block the flow of ink through the ink delivery conduit 33.

Although specific embodiments of the invention have been described and illustrated, the invention is not to be limited to the specific forms or arrangement of parts so described and illustrated. For example, although the specific embodiments described herein are directed to ink-jet print heads, the invention can be used with both piezoelectric and continuous flow print heads. Thus, the invention is limited only by the claims.

We claim:

1. Apparatus for preventing ink from leaking from a print head of an ink-jet delivery system, said print head being adapted for ejecting droplets of ink selectively upon a proximate printing medium such that the droplets form graphics images and alphanumeric characters on the medium, wherein the print head is coupled to the apparatus such that the print head has an operating pressure of less than atmospheric pressure, and said system includes a source of ink having a supply pressure greater than the print head operating pressure, the apparatus comprising:

a back pressure regulator fluidically coupling the source of ink and the print head such that the supply pressure is reduced to the operating pressure, said regulator including first means for interrupting flow of ink from said source to said print head; and second means for interrupting flow of ink from said source to said print head, said second means including a conduit means for connecting the source of ink with the back pressure regulator, the conduit means having a conduit and a conduit means open position and a conduit means shut position such that when the operating pressure approaches the atmospheric pressure, the conduit moves to the shut position, preventing ink from flowing into said regulator and leaking out of the regulator through the print head.

2. The apparatus of claim 1 further comprising:

the conduit means having an ink inlet means for transferring ink received from said source into said regulator, said ink inlet means having an intake orifice, movable from an ink intake orifice open position to an ink intake orifice shut position, and said first means having a valve seat mounted in said regulator relative to the conduit such that the valve seat blocks the conduit when the operating pressure approaches the atmospheric pressure.

3. The apparatus of claim 2 further comprising:

said valve seat shuts said conduit independently of a conduit position, when the operating pressure of the print head approaches the atmospheric pressure.

4. The apparatus of claim 2 wherein the second means further comprises:

a bi-stable over-center spring connected to the conduit means for selectively placing the conduit means in the shut position or the open position.

5. The apparatus of claim 2 further comprising:

a spring wherein the second means includes a conduit stop valve mounted proximate to an end of the conduit, and the conduit is connected at an opposite end to said spring such that the conduit is biased to the open position by said spring in a condition of said operating pressure.

6. The apparatus of claim 4 further comprising:

the conduit means is connected to said spring biased to the conduit means open position whenever pressure within said regulator is less than the atmospheric pressure.

7. An ink delivery system for an ink-jet print head, comprising:

an ink supply system having an ink reservoir and having means for delivering ink from the reservoir under a positive pressure;

a back pressure regulator means for receiving ink from the reservoir and delivering ink to the print head a predetermined negative pressure with respect to ambient atmospheric pressure, the regulator means being fluidically coupled between the print head and the reservoir and the regulator means including an ink accumulation chamber and an intermediate ink chamber upstream of said ink accumulation chamber, the regulator means further including means for blocking delivery of ink from the intermediate ink chamber into the ink accumulation chamber when the accumulation chamber is full by balancing the ambient atmospheric pressure and the predetermined negative pressure;

mounted within said regulator means, means for blocking delivery of ink from the reservoir into the intermediate ink chamber, including an ink conduit, a bi-stable biasing means for biasing the conduit into a first position in which the conduit is open, allowing free flow of ink from the reservoir into the intermediate ink chamber through the conduit into the ink accumulation chamber, and a second position in which the conduit is closed, blocking free flow of ink from the intermediate ink chamber into the ink accumulation chamber, the biasing means having a predetermined spring constant for maintaining the regulator means at said predetermined negative pressure during printing operation, and valving means for blocking flow of ink through said conduit independently of said biasing means.

8. A method for preventing ink from drooling from a print head of a back pressure regulator ink-jet apparatus including a pressure regulator and adapted for use in a pressurized ink supply and delivery apparatus, said print head is mounted to said pressure regulator and is fluidically coupled to a source of ink there through by an ink conduit having an ink inlet orifice for receiving ink from the source and an ink outlet orifice for expelling ink into said regulator and is adapted for ejecting droplets of ink on to an adjacent printing medium, comprising the steps of:

a) providing said pressure regulator between said source of ink and said print head for operating the print head at an operating pressure of less than atmospheric pressure;

b) pressuring the source of ink to a source pressure greater than the print head operating pressure;

c) delivering the ink through said ink conduit from the source to the print head, said ink conduit having a longitudinal axis, a first operating position in which the conduit is open to ink flow, and a second operating position in which the conduit is closed to ink flow;

d) blocking delivery of ink to the print head if the operating pressure of the print head approaches atmospheric pressure during operation by either moving the conduit from the first position wherein the conduit permits ink flow there through to the second position wherein the conduit does not permit ink flow there through or by independently blocking at least one of said inlet orifice and said outlet orifice, thereby preventing pressure within said regulator from reaching atmospheric pressure and causing ink drooling from the print head.

9. The method of claim 8 wherein the step of blocking the delivery of ink to the print head includes the steps of:

moving the ink conduit with respect to said longitudinal axis such that the conduit is closed off from said source of ink.

* * * * *